United States Patent Office 3,245,947
Patented Apr. 12, 1966

3,245,947
PHENOLIC RESIN COMPOSITIONS CONTAINING
BIS-(AMINOPHENYL)-SULFONES
Norman D. Hanson, Dunedin, Fla., and Sidney J. Schultz, Cranford, N.J., assignors to Union Carbide Corporation, a corporation of New York
No Drawing. Filed June 13, 1961, Ser. No. 116,707
18 Claims. (Cl. 260—49)

This invention relates to thermosetting phenolic resin compositions. More particularly, this invention relates to the addition of bis-(aminophenyl)-sulfones to thermosetting phenolic resins thereby increasing the heat-resistivity of the phenolic resins.

Currently there is a need for thermosetting phenolic resin compositions having improved resistance to heat in view of the rapidly expanding use of such compositions in applications wherein extremely high temperatures are encountered. As an illustration, thermosetting phenolic resin compositions, being relatively light in weight as compared to metals, and being more resistant to heat than compositions based on other types of resins, for instance vinyl resins, are finding increased use as component parts of missiles and of high speed aircraft. As component parts of missiles and high speed aircraft, for example, missile nose cones and jet engine impeller blades, these compositions are being subjected to extremely high temperatures.

While presently known thermosetting phenolic resin compositions have shown some ability to resist deformation on being subjected to high temperatures, they have been found to undergo undesirable dimensional changes and loss of physical strengths, particularly when exposed to high temperatures over prolonged periods of time. Consequently, performability of missiles and of high speed aircraft is frequently impaired by the use of parts therein which are made from these compositions.

The present invention provides for thermosetting phenolic resin compositions which have excellent heat-resistivity and therefore are particularly desirable for use in applications wherein resistivity to heat is essential. The compositions of this invention can be formed into shaped structures and successfully used as parts in missiles and in high speed aircraft as they undergo none of the undesirable dimensional changes attributed to previously known thermosetting phenolic resin compositions. In addition, the compositions of this invention, by reason of their relatively light weight and by reason of their resistivity to heat, are preferred over ceramics and metals in applications wherein both lightness in weight and heat-resistivity are desired. Furthermore, the compositions of the present invention can be dissolved in a suitable solvent and used as laminating varnishes for bonding together layers of mineral fiber cloth to form unitary structures which are excellently suited for use as thermal insulation.

The thermosetting phenolic resin compositions of this invention comprise a thermosetting condensation product of a phenol and an aldehyde; and a bis-(aminophenyl)-sulfone, wherein the bis-(aminophenyl)-sulfone is present in the compositions in a heat-stabilizing amount, that is in an amount sufficient to stabilize the compositions against the effects of heat. Generally, the compositions of this invention contain from about 1 percent by weight to about 60 percent by weight and preferably from about 4 percent by weight to about 40 percent by weight of a bis-(aminophenyl)-sulfone based on the weight of the condensation product of a phenol and an aldehyde.

In those instances wherein the condensation product of a phenol and an aldehyde is a liquid, the weight thereof is based upon its solids content. The solids content is determined according to the following procedure: A 1.5 gram sample of condensation product is heated in an oven, which is at 135° C., for three hours. The residue is then cooled to room temperature, i.e. 23° C. and weighed. The numerical weight of the residue is divided by the numerical weight of the sample and the result multiplied by 100. The result obtained indicates the percent weight per 1.5 grams of liquid condensation product.

Suitable condensation products of a phenol and an aldehyde, for purposes of this invention, are the condensation products, generally acid catalyzed, referred to as "novolac resins" and condensation products, generally alkaline catalyzed, referred to as "resole resins."

Condensation products referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle, grindable resins which can be converted to the infusible state by the addition thereto of a methylene-generating agent such as hexamethylenetetramine.

Condensation products generally referred to as "resole resins" are usually prepared by condensing a phenol and an aldehyde in the presence of a base such as an alkali metal oxide or hydroxide or an alkaline earth metal oxide or hydroxide, as for example, sodium hydroxide, potassium hydroxide, calcium hydroxide, calcium oxide and the like, or an amine, or ammonia; wherein the aldehyde is present in the reaction mixture in greater than stoichiometric amounts. The resoles are either liquid resins, soft resins having a low melting point or hard, brittle grindable resins and are heat-hardenable per se to the infusible state, that is, they will thermoset to infusible products under the influence of heat without the use of a methylene-generating agent.

Illustrative of suitable phenols which can be condensed with an aldehyde to produce thermosetting condensation products of a phenol and an aldehyde whose heat-resistivity can be significantly improved by the addition thereto of a bis-(aminophenyl)-sulfone can be noted: phenol; dihydric phenols such as resorcinol; meta-substituted phenols such as the meta-alkylated phenols exemplary of which are m-cresol, m-ethylphenol, m,n-propylphenol, m-isopropylphenol, m,n-butylphenol, m-sec-butylphenol, m-tert-butylphenol, m-amylphenol and other like phenols, particularly those wherein the alkyl substituent contains from 1 to 6 carbon atoms inclusive, as well as the commercialy available meta-cresol which contains small amounts of both the para and the ortho isomers; meta-substituted alkoxy phenols such as m-methoxy phenol, m-ethoxy phenol, m,n-propoxy phenol, m-amyloxy phenol and the like particularly those wherein the alkoxy group contains from 1 to 6 carbon atoms inclusive; metahalogenated phenols such as m-chlorophenol, m-bromophenol, m-iodophenol and the like.

Examples of aldehydes which can be condensed with the phenols listed above to produce suitable condensation products are: formaldehyde in any of its available forms, i.e., formalin, para-formaldehyde; furfural and the like.

For a detailed discussion of condensation products produced from a phenol and an aldehyde and methods for the production thereof, reference is made to the books: "Phenoplasts" by T. S. Carswell, published in 1947 by Interscience Publishers, and "Chemie der Phenolharze" by K. Hultzsch, Springer Varlag, 1950, which are incorporated herein by reference.

Exemplary of suitable bis-(aminophenyl)-sulfones which are added to thermosetting condensation products of a phenol and an aldehyde to produce the compositions of this invention are those having the formula:

Formula I

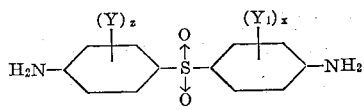

wherein each Y and each $Y_1$, which can be the same or different, are alkyl radicals such as methyl, ethyl, n-propyl, n-hexyl and the like, preferably alkyl radicals containing from 1 to 4 carbon atoms inclusive; or halogen atoms, i.e., chlorine, bromine, iodine, or fluorine; or alkoxy radicals such as methoxy, ethoxy, n-propoxy, n-amyloxy and the like, preferably alkoxy radicals containing from 1 to 4 carbon atoms inclusive; z and x, which can be the same or different, are integers each of which have a value of 0 to 4 inclusive.

Specific compounds coming within the purview of Formula I are the following: bis-(4-aminophenyl)-sulfone, 5'-methyl-4,4'-diaminodiphenylsulfone, 3'-chloro-4,4-diaminodiphenylsulfone, and the like.

Bis-(aminophenyl)-sulfones having a structural formula coming within the purview of Formula I can be conveniently prepared according to the procedures described in a book by Chester M. Suter, "The Organic Chemistry of Sulfur" published by John Wiley & Sons, copyright 1944, which is incorporated herein by reference, at pages 695–707 thereof.

For purposes of this invention, thermosetting phenolic compositions containing a bis-(aminophenyl)-sulfone and a condensation product of a phenol and an aldehyde, which is heart-hardened per se, are particularly preferred as the resultant compositions will thermoset to infusible products in a very short period of time on being subjected to elevated temperatures, generally on the order of about 150° C. to about 200° C. without the use of a methylene-generating agent. Consequently, such compositions can be molded into desired structures using molding cycles of short duration.

The compositions of this invention can be formulated by a number of convenient methods, the particular method depending upon the desired ultimate use of the compositions. A particularly preferred method of producing laminating varnishes is one wherein a condensation product of a phenol and an aldehyde is prepared in a still and the desired bis-(aminophenyl)-sulfone added directly thereto. As an illustration of the preferred method of forming laminating varnishes, a composition, hereinafter referred to as Composition A was prepared as follows: Into a still there was charged 115 parts by weight of formalin (37%) and 100 parts by weight of phenol. Two parts by weight of a 25 percent by weight aqueous solution of sodium hydroxide were then added into the still and the contents in the still brought to reflux, about 100° C.–102° C. under atmospheric pressure and maintained at this temperature for 70 minutes. At the end of this period, 0.62 part by weight of sulfamic acid dissolved in 1.86 parts by weight water were poured into the still. The contents of the still were vacuum dehydrated up to a temperature of about 90° C. to about 100° C. under a pressure of about 25–75 mm. of Hg. Sufficient ethyl alcohol was added to the dehydrated resin to produce a solution having a solids content of about 64 percent by weight. To about 100 parts by weight of the resin solution so produced, there was added 20 parts by weight of bis-(4-aminophenyl)-sulfone. The resultant mixture was refluxed at a temperature of about 85° C.–90° C. for 15 minutes with the result that a clear solution was obtained. The solids contents of the resin solution was adjusted to about 60 percent by weight by the addition thereto of ethyl alcohol. The viscosity of the solution at 23° C. was 325 centistokes.

When formulating compositions of this invention which are to be used in molding applications, various compounding techniques can be used. Among such techniques can be noted the following.

(1) Dry blending a condensation product of a phenol and an aldehyde, a bis-(aminophenyl)-sulfone and any desired additive in a ball mill, drum tumbler, or in a ribbon blender.

(2) Fluxing a condensation product of a phenol and an aldehyde, a bis-(aminophenyl)-sulfone and any desired additive in a differential speed mill, a Banbury mixer or in an extruder, cooling the fluxed composition to room temperature, and grinding the fluxed composition to the desired particle size.

(3) Forming an organic solution or an aqueous solution of a mixture of a condensation product of a phenol and an aldehyde and a bis-(aminophenyl)-sulfone, impregnating a filler such as asbestos with the solution, drying the impregnated filler and dicing the impregnated filler to the desired size.

(4) Forming a water slurry of a condensation product of a phenol and an aldehyde, a bis-(aminophenyl)-sulfone and any desired additive, dropping the slurry onto a screen of a Fourdrinier paper making machine, drying the slurry to form a mat and then chopping the mat into small pieces of desired size.

In those instances wherein the condensation product of a phenol and an aldehyde, which is admixed with a bis-(aminophenyl)-sulfone, is a so-called novolac resin, it is customary to incorporate into the resultant composition a methylene-generating compound which will insure that the composition when heated, will thermoset to an infusible product. Illustrative of such methylene-generating compounds are hexamethylenetetramine, anhydro-formaldehyde aniline, paraform and the like. In those instances wherein the composition contains a material which is thermosetting per se, that is, wherein the condensation product of a phenol and an aldehyde is heat-hardenable per se, no such methylene-generating compounds are generally used. A discussion of suitable methylene-generating compounds is to be found in the book by T. S. Carswell previously noted.

When used, the methylene-generating compounds are employed in amounts of from about 5 percent by weight to about 20 percent by weight, preferably about 10 percent by weight, based on the weight of the condensation product of a phenol and an aldehyde. More than 20 percent by weight can be used but this is economically undesirable.

Also, if so desired, any of the conventional catalysts used to promote the thermosetting of phenolic resins can be used, in all instances, as an aid in thermosetting compositions of this invention. These catalysts, when employed, are used in amounts of from about 1 percent by weight to about 20 percent by weight, preferably from about 2 percent by weight to about 6 percent by weight based on the weight of the condensation product of a phenol and an aldehyde. Exemplary of such catalysts are the alkali metal hydroxides such as sodium hydroxide, potassium hydroxide and the like; the alkaline earth metal hydroxides such as calcium hydroxide and the like; alkaline earth metal oxides such as calcium oxide and the like.

Compositions of this invention can also contain various other additives, as are well known in the art. Illustrative of such additives are the so-called fillers which are inert materials usually added to phenolic resin compositions in order to improve the physical characteristics thereof. Illustrative of such fillers are the following: the mineral fillers such as asbestos, wollastonite, mica, silica, graphite, and the like; and organic fillers such as woodflour, cotton flock, polyamide fibers, polyester fibers, graphite cloth, graphite fibers and the like. Fillers, when used, are generally employed in amounts of from about 15 percent by weight to about 300 percent by weight based on the weight of the condensation product of a phenol and an aldehyde.

Other materials, commonly added to phenolic resin compositions, are lubricants such as carnauba wax, candelilla wax, zinc stearate and the like; and colorants such as titanium dioxide and the like.

As previously pointed out, the compositions of this invention have particular utility as compositions which can be molded into articles of desired shape and the articles so produced used in applications wherein excellent resistivity to heat is required. The exact conditions under which compositions of this invention can be molded will, of course, vary depending in part upon the particular composition being molded and the configuration and size of the article being formed. As a general rule, suitable molding temperatures range from about 150° C. to about 200° C.

When the compositions of this invention are to be used as laminating varnishes, they are dissolved in solvents which are inert and non-deleterious thereto such as methanol, ethanol, acetone, methyl ethyl ketone and the like. Generally such varnishes have a solids content of about 60 to about 70 percent by weight. Solids content of the varnishes is determined as previously described in regard to liquid phenol-aldehyde condensation products.

Fabrics such as glass or asbestos fiber fabrics, which are to be laminated, are then impregnated with the desired laminating varnish. Layers of the impregnated materials are stacked one on another and subjected to heat and pressure. Upon heating the stacked materials, the solvent is driven off. On applying pressure and more heat, the composition thermosets to an infusible product bonding together the fabric layers into a unitary structure. The actual pressures and temperatures employed will, of course, vary and depend in part upon the exact composition used.

The following examples further illustrate the present invention and are not intended to limit the scope thereof.

Condensation Product I noted in the examples was prepared as follows: Into a still there was charged 115 parts by weight of formalin (37%) and 100 parts by weight of phenol. Two parts by weight of a 25 percent by weight aqueous solution of sodium hydroxide were then added into the still and the contents in the still brought to reflux, about 100° C.–102° C., under atmospheric pressure, and maintatined at this temperature for 70 minutes. At the end of this period, 0.62 part by weight of sulfamic acid dissolved in 1.86 parts by weight water were poured into the still. The contents of the still were vacuum dehydrated up to a temperature of about 90° C. to about 100° C. under a pressure of about 25–27 mm. of Hg. Sufficient ethyl alcohol was added to produce a solution having a solids content of 64 percent by weight.

Composition A noted in the examples was produced as previously described herein. Composition B noted in the examples was the same as Composition A with the exception that Composition B contained 3 parts by weight of bis-(4-aminophenyl)-sulfone, had a solids content of 60 percent by weight and a viscosity of 250 centistokes at 23° C.

*Example 1*

Three different samples of woven glass fabrics, each of which had a finish of triethoxyaminopropylsilane, were saturated with Condensation Product I, Composition A and Composition B and dried for 7 minutes at 120° C. Each fabric had a resins content of 32 percent by weight and a volatiles content of 3 percent by weight. The volatiles content was measured by weighing a 4 inch disc of each treated fabric, placing each disc in an oven which was at 160° C. for 5 minutes and weighing the dried disc. The loss in weight was converted to percent volatiles.

Fourteen layers of fabric, each of which was impregnated with Condensation Product I, Composition A or Composition B, were molded into flat panels 12 inches by 16 inches. Panels were prepared by stacking layers of impregnated fabric one on another and subjecting the layers so stacked to a pressure of 200 p.s.i.g., between platens which were at 160° C. for 60 minutes. Each panel was then heated at 150° C. for 12 hours, at 200° C. for 12 hours, at 260° C. for 4 hours and then at 316° C. for 4 hours.

Panels so prepared were then tested for flexural strength and modulus of elasticity.

| | Flexural Strength (p.s.i.) | Modulus of Elasticity (p.s.i.) |
|---|---|---|
| Panels Prepared Using Condensation Product I: | | |
| As molded, tested at 23° C. | 73,905 | $3.75 \times 10^6$ |
| As molded, tested at 260° C. | 49,157 | $3.00 \times 10^6$ |
| Aged for 100 hours at 260° C. and tested at 23° C. | 14,394 | $2.46 \times 10^6$ |
| Aged for 100 hours at 260° C. and tested at 260° C. | 12,417 | $2.21 \times 10^6$ |
| Aged for 100 hours at 315° C. and tested at 23° C. | (1) | (1) |
| Aged for 100 hours at 315° C. and tested at 260° C. | (1) | (1) |
| Panels Prepared Using Composition A: | | |
| As molded, tested at 23° C. | 87,670 | $4.2 \times 10^6$ |
| As molded, tested at 260° C. | 60,706 | $3.03 \times 10^6$ |
| Aged for 100 hours at 260° C. and tested at 23° C. | 78,695 | $4.08 \times 10^6$ |
| Aged for 100 hours at 260° C. and tested at 260° C. | 69,371 | $3.50 \times 10^6$ |
| Aged for 100 hours at 315° C. and tested at 23° C. | 66,667 | $3.2 \times 10^6$ |
| Aged for 100 hours at 315° C. and tested at 260° C. | 60,500 | $3.1 \times 10^6$ |
| Panels Prepared Using Composition B: | | |
| As molded, tested at 23° C. | 75,292 | $3.60 \times 10^6$ |
| As molded, tested at 260° C. | 60,423 | $3.17 \times 10^6$ |
| Aged for 100 hours at 260° C. and tested at 23° C. | 54,403 | $3.03 \times 10^6$ |
| Aged for 100 hours at 315° C. and tested at 260° C. | 54,842 | $3.01 \times 10^6$ |

[1] No measurable strength.

Flexural strengths noted in this and subsequent examples were determined according to method No. 1031 described in Federal Specification L–P–406b Plastics, Organic: General Specifications, Test Methods.

Modulus of elasticity values noted in this example were determined according to the procedure described in (ASTMD 790).

The glass fabrics noted in this example had a thickness of 0.0085 inch, a weight of 8.90 ounces per square yard and an 8 harness satin weave.

*Example 2*

Compositions, whose formulations are noted below, were pre-blended in a kneader for 5 minutes and then dried by heating for 2 hours at 40° C. under a vacuum of 29 inches of mercury.

Control 2: Amounts by weight
    Condensation Product I _____ 50
    Calcium stearate _____ 1.5
    Silica fibers (½ inch long) _____ 68.5

Composition C:
    Composition A _____ 50
    Calcium stearate _____ 1.5
    Silica fibers (½ inch long) _____ 68.5

Bars, ¼ of an inch thick, ½ of an inch wide and 5 inches long were molded from these compositions under a pressure of 2,600 p.s.i.g., and at a temperature of 160° C.

The molded bars were heated at 160° C. for 10 minutes and then tested for flexural strength.

Flexural
Bars prepared from control 2: strength (p.s.i.)
    As prepared, tested at 23° C. _____ 4,100
    Aged for 400 hours at 260° C. and tested at 23° C. _____ 1,500

Bars prepared from composition C:
    As prepared, tested at 23° C. _____ 10,000

What is claimed is:
1. A thermosetting composition comprising a thermo- setting precondensate of a phenol and an aldehyde, said precondensate being free of sulfur atoms; and bis-(aminophenyl)-sulfone of the formula:

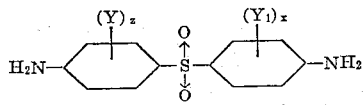

wherein each Y and $Y_1$ are selected from the group consisting of alkyl radicals, alkoxy radicals and halogen atoms, and $z$ and $x$ are integers having values of 0 to 4 inclusive, wherein said bis-(aminophenyl)-sulfone is present in said composition in an amount of from about 1 percent by weight to about 60 percent by weight based on the weight of said precondensate.

2. The thermoset product of the composition defined in claim 1.

3. A thermosetting composition as defined in claim 1 wherein the said bis-(aminophenyl)-sulfone is present in said composition in an amount of from about 4 percent by weight to about 40 percent by weight based on the weight of said precondensate.

4. The thermoset product of the composition defined in claim 3.

5. A thermosetting composition as defined in claim 1 wherein the said bis-(aminophenyl)-sulfone is bis-(4-aminophenyl)-sulfone.

6. The thermoset product of the composition defined in claim 5.

7. A thermosetting composition as defined in claim 3 wherein the said bis-(aminophenyl)-sulfone is bis-(4-aminophenyl)-sulfone.

8. The thermoset product of the composition defined in claim 7.

9. A thermosetting composition as defined in claim 1 wherein the said precondensate is the reaction product of phenol and formaldehyde.

10. The thermoset product of the composition defined in claim 9.

11. A thermosetting composition as defined in claim 3 wherein the said precondensate is the reaction product of phenol and formaldehyde.

12. A thermosetting composition comprising a filler, a thermosetting precondensate of a phenol and formaldehyde, said precondensate being free of sulfur atoms; and a bis-(aminophenyl)-sulfone of the formula:

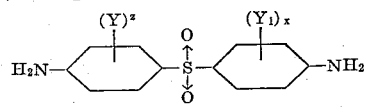

wherein each Y and each $Y_1$ are selected from the group consisting of alkyl radicals, alkoxy radicals, and halogen atoms, and $z$ and $x$ are integers having a value of 0 to 4 inclusive, wherein said bis-(aminophenyl)-sulfone is present in said composition in an amount of from about 1 percent by weight to about 60 percent by weight based on the weight of said precondensate.

13. The thermoset product of the composition defined in claim 12.

14. A composition as defined in claim 12 wherein the said precondensate is a novolac resin.

15. The thermoset product of the composition defined in claim 14.

16. A thermosetting composition as defined in claim 12 wherein the said precondensate is a resole resin.

17. The thermoset product of the composition defined in claim 16.

18. A coating composition comprising the composition of claim 1 in an organic solvent.

References Cited by the Examiner

UNITED STATES PATENTS

| | | | |
|---|---|---|---|
| 1,954,377 | 4/1934 | Calcott et al. | 260—45.9 |
| 2,745,816 | 5/1956 | Dykstra | 260—56 |

OTHER REFERENCES

Suter, C. M.: "Organic Chemistry of Sulfur," John Wiley & Sons, Inc., New York, N.Y., 1944, page 704.

WILLIAM H. SHORT, *Primary Examiner.*

HAROLD N. BURSTEIN, *Examiner.*